United States Patent

[11] 3,608,542

| [72] | Inventors | Allan F. Pacela<br>Diamond Bar;<br>Fredrick J. Savaglio, Yorba Linda, both of Calif. |
|---|---|---|
| [21] | Appl. No. | 48,853 |
| [22] | Filed | June 12, 1970 |
| [45] | Patented | Sept. 28, 1971 |
| [73] | Assignee | Beckman Instruments, Inc.<br>Continuation of application Ser. No. 656,805, July 28, 1967, now abandoned. |

[54] PHYSIOLOGICAL MONITORING SYSTEM
43 Claims, 16 Drawing Figs.

[52] U.S. Cl. .................................................. 128/2.1 R, 340/309.1
[51] Int. Cl. ...................................................... A61b 5/04
[50] Field of Search ........................................ 128/2.05 R, 2.06 R, 2.06 A, 2.08, 2.1 R; 340/279, 309.1

[56] References Cited
UNITED STATES PATENTS

| 3,123,768 | 3/1964 | Burch et al. | 128/2.1 UX |
| 3,144,019 | 8/1964 | Haber | 128/2.06 A |
| 3,316,902 | 5/1967 | Winchel et al. | 128/2.1 R UX |
| 3,342,176 | 9/1967 | Kaplan | 128/2.06 R |
| 3,347,223 | 10/1967 | Pacela | 128/2.08 X |
| 3,414,896 | 12/1968 | Glick et al. | 340/279 X |
| 3,433,217 | 3/1969 | Rieke | 128/2.1 R |

*Primary Examiner*—Anton O. Oechsle
*Attorney*—Richard M. Jennings

ABSTRACT: A respiration monitoring system utilizing an impedance pneumograph which provides an electrical signal having a characteristic that varies in accordance with transthoracic impedance changes during respiratory cycles. Motion artifacts and heart-coupled pulmonary blood flow signal components are eliminated by a narrow band-pass filter and amplifier in conjunction with an adjustable level detector which generates both respiratory rate and volume information in digital form to drive an integrating tachometer and an audiovisual alarm system having an adjustable alarm timer and an adaptive timer adapted to override the adjustable timer under certain conditions of respiration activity. Also, drifts in the total transthoracic impedance are monitored through the same alarm system to determine an equipment failure or loose electrode in the impedance pneumograph. The adjustable level detector discriminates against signals which do not exceed a first level related to respiratory inspiration after having dropped below a second level related to respiratory exhalation.

INVENTORS.
ALLAN F. PACELA
FREDRICK J. SAVAGLIO
BY
FOWLER, KNOBBE
& MARTENS
    ATTORNEYS.

INVENTORS.
ALLAN F. PACELA
FREDRICK J. SAVAGLIO
BY
FOWLER, KNOBBE
& MARTENS
ATTORNEYS.

PHYSIOLOGICAL MONITORING SYSTEM

This application is a continuation of our earlier filed application, Ser. No. 656,805, filed July 28, 1967, and now abandoned.

This invention relates to a physiological monitoring system and has particular reference to an electrical apparatus for continuously monitoring physiological activity such as respiration in a living body, especially a human body.

The monitoring of breathing, blood pressure, temperature, pulse, heart rate and other physiological activity can be accomplished by bringing various transducers into proximity or contact with the body, at least in the sense of producing an electrical signal which varies as the physiological activity changes. For example, in the monitoring of respiration various instruments have been employed such as the body plethysmograph, the spirometer, the thermistor-nostril sensor, the chest-band strain gage, and the impedance pneumograph. Conventionally the electrical signal from the transducer is recorded, and later analyzed in an attempt to identify various factors involved in the dynamics of the physiological activity being monitored.

While this approach seems straightforward enough, there are a host of complicating factors which mitigate against the utility of such monitoring. Each specific physiological activity of interest is within itself a large subject not completely understood, and the electrical signal resulting from attempted monitoring may be no more than an indirect analog of only a few of the many characteristics of the activity in the body. Furthermore, the electrical signal will be the product of numerous physiological activities in progress in the body in addition to the specific activity of interest depending upon the selectivity of the transducer, as well as a composite of extraneous signals from various sources and causes within and without the monitoring apparatus.

In accordance with the present invention, apparatus for monitoring physiological activity in a living body and producing a corresponding varying electrical signal includes a means for identifying signal components corresponding to specific physiological activity. The identifying means includes a detector for providing output signals responsive to a characteristic of the input signal passing a threshold level. And, the apparatus includes means for sensing the output signal of the detector.

The preferred embodiment of the invention is as a respiration monitor especially for use with premature infants where apneaneonatorum or respiratory failure is a common cause of death and where the unpredictable and widely varying patterns of respiration, body movement, heartbeat and pulmonary blood flow pose especially difficult problems to respiration monitoring. In this embodiment of the invention the monitoring means is an impedance pneumograph, preferably of the constant-current type. The identifying means comprises a narrow band-pass filter and a detector which operate as a digital breath identification circuit, discriminating against signals from body movement, pulmonary blood flow and other causes in favor of the signal resulting from respiration, and digitally identifying respiration on a breath-by-breath basis in a manner which includes both volume and rate information. The sensing means is an audiovisual alarm system having adaptive characteristics. In addition to the digital breath identification circuit, an electrode monitoring circuit is coupled to the alarm system.

The invention is explained in detail in the following paragraphs taken in conjunction with the accompanying drawings in which:

FIGS. 2 to 11 are approximate waveform diagrams illustrating qualitatively the operation of the monitoring apparatus of FIG. 1; more specifically.

Figure 1:
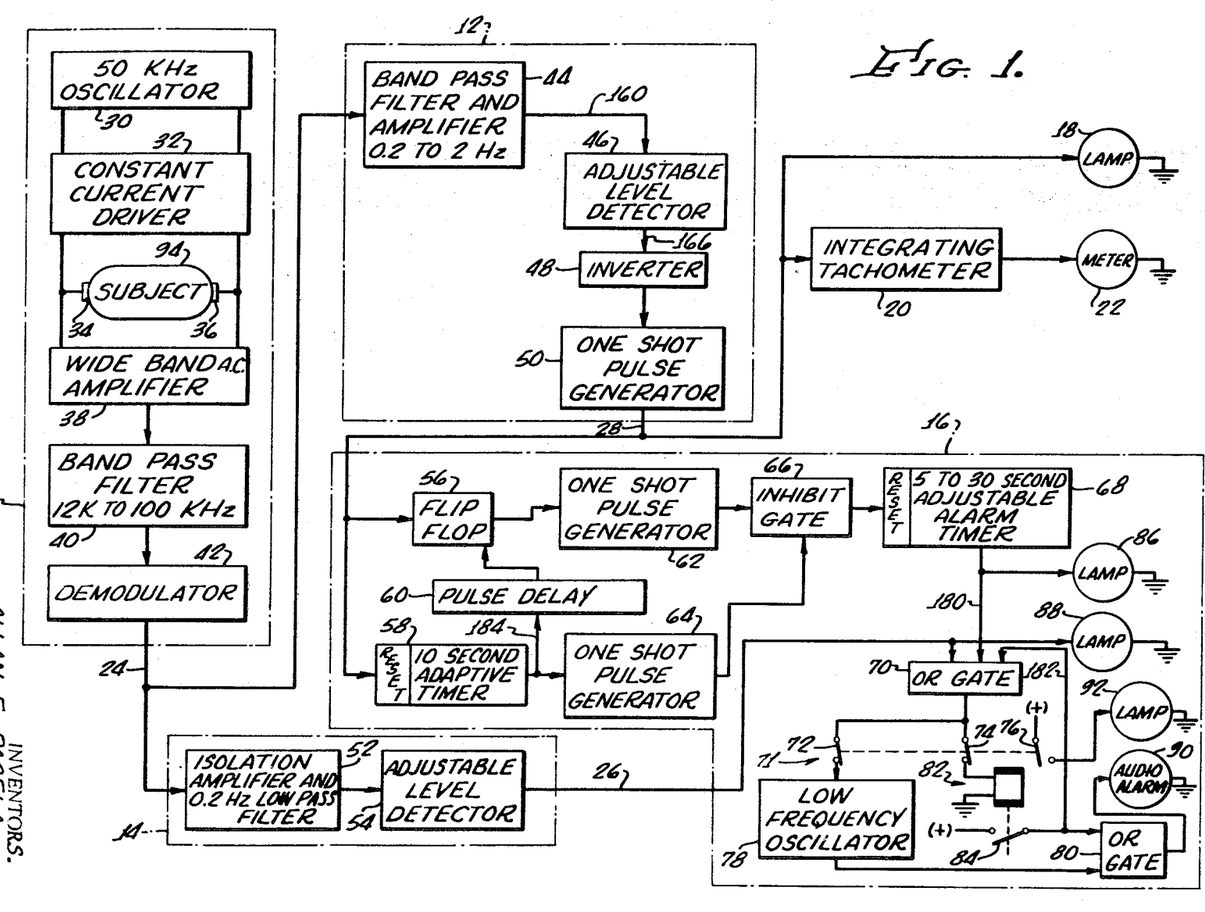
FIG. 1 is a schematic block diagram illustrating the preferred embodiment of the physical monitoring apparatus of the invention.
Figure 2:
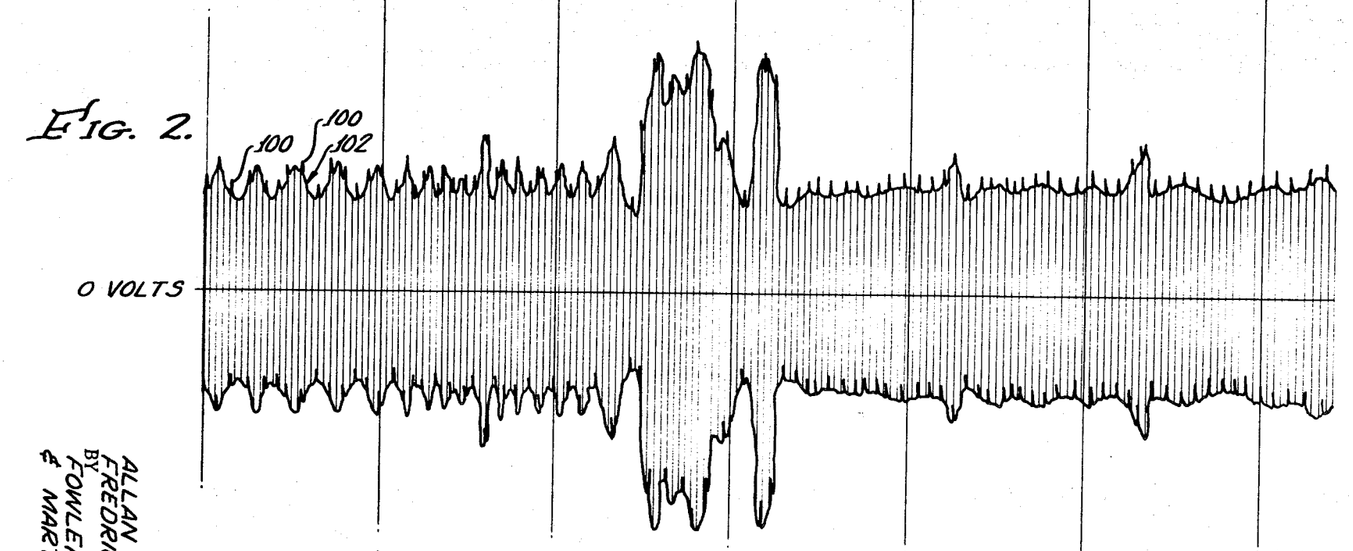
FIG. 2 is the emergent waveform from the wide-band amplifier in the impedance pneumograph of FIG. 1.

Referring now to FIG. 1, the physiological monitoring apparatus includes a constant-current impedance pneumograph 10, a breath identification circuit 12, an electrode monitoring circuit 14, an adaptive alarm circuit 16, a breath identification lamp 18, an integrating tachometer 20, and a meter 22. The output signal from the impedance pneumograph 10 is supplied over a lead 24 to the breath identification circuit 12, and to the electrode monitoring circuit 14. The electrode monitoring circuit output is supplied over a lead 26 to the adaptive alarm circuit 16. The output from the breath identification circuit is supplied over a lead 28 to the adaptive alarm circuit 16, to the breath identification lamp 18 and to the integrating tachometer 20. The integrating tachometer drives the meter 22.

The impedance pneumograph serves as a transducer for monitoring impedance changes across the thorax of a subject and producing a correspondingly varying electrical signal. It includes a 50 kHz. (50,000 cycles per second) oscillator 30, a constant-current driver 32, a pair of silver-silver chloride biological skin electrodes 34, 36, a wide-band amplifier 38, a 12 kHz. to 100 kHz. band-pass filter 40 and a demodulator 42.

The breath identification circuit 12 identifies respiration on a breath-by-breath basis and provides both volume and rate information. This circuit includes a 0.2 to 2 Hz. band-pass filter and amplifier 44, an adjustable level detector 46, an inverter 48 and a one-shot pulse generator 50.

The electrode monitoring circuit 14 responds to substantial changes in the base or resting impedance across the thorax, as might be occasioned by the detachment of an electrode from the subject. It includes an isolation amplifier and 0.2 Hz. low-pass filter 52, and an adjustable level detector 54.

The adaptive alarm circuit 16 senses various conditions of respiratory failure and failure in equipment operation and attendance. It includes a flip-flop or counter 56, a 10 seconds timer 58 referred to herein as the adaptive timer, a pulse delay 60, first and second one-shot pulse generators 62, 64, an inhibit gate 66, a 5 to 30 seconds adjustable timer 68 herein referred to as the alarm timer, an OR gate 70, a three-pole ganged manual switch 71 having first, second and third poles 72, 74, 76, a low-frequency oscillator 78, a second OR gate 80, a time delay relay 82 having a normally open switch 84, an Apnea (or low breathing rate) alarm lamp 86, an electrode alarm lamp 88, an audio alarm 90 and a third lamp 92 herein called an audio alarm disabled lamp.

The use of constant-current impedance pneumography for respiratory tidal volume measurements is well known; see, for example, Pacela, A. F., Impedance Pneumography, A Survey of Instrumentation Techniques, *Medical Biological Engineering*, 4:1–15, 1966. In the impedance pneumograph 10, a constant AC carrier current, with zero DC component is provided by the oscillator 30 and driver 32 and applied across the thorax of a subject 94, such as a premature infant, by means of the biological skin electrodes 34, 36. The electrodes are attached directly to the skin, utilizing a gel in the interface in accordance with conventional practice. The very small constant AC current (typically 100 microamperes) and the high frequency of 50 kHz. insure that the subject is not stimulated or made uncomfortable.

Since the current is constant, the instantaneous magnitude or amplitude of the AC carrier signal across the subject is directly proportional to the magnitude of the subject impedance, $|z|$. The changes $\Delta|z|$ in the subject impedance therefore cause corresponding modulation of the carrier amplitude during the normal respiratory cycle. Consequently the voltage drop measured across the electrodes varies according to the relationship:

$$\Delta E = I \Delta |z|$$

where $I$ is the constant current and $\Delta|z|$ is the transthoracic impedance change of the subject due to respiration. This relationship produces amplitude modulation of the carrier envelope.

Typically, the magnitude of the impedance changes due to respiration are about 0.1 percent to 0.3 percent of the resting or total impedance across the thorax, so that the modulating signal resulting from respiration is quite small in amplitude and can be masked by or swamped out by motion artifacts and other physiological activities in the body. For example, pulmonary blood flow produces a transthoracic impedance change that can be of equal or greater amplitude especially in infants having severe respiratory disorders.

This masking can be especially severe in some infants where the onset of apnea may be accompanied by a decreasing heart rate such that the frequencies of respiration and heart-coupled pulmonary blood flow overlap. Infants, particularly premature infants with respiratory problems, are characterized by widely varying respiratory and heart rates. For example, the breath rate of a normal infant may vary between 30 to 60 breaths per minute, with heart rate varying between 90 to 180 beats per minute. Respiratory rates of up to 120 breaths per minute and higher are common in the premature infant, and heart rates can and do vary up and down from the normal range.

In addition to involuntary physiological activity, there are a number of other sources of masking signals. For example, motion artifacts and the ECG. or electrocardiogram signal. Motion artifacts are real or apparent transthoracic impedance changes resulting form body movement and producing amplitude modulation of the carrier signal at an instantaneous frequency usually but not always higher than respiratory rates. For example, the striking of an electrode or the disturbing of an electrode-skin interface can produce a modulating signal having components of relatively large amplitude and of a frequency equal to or greater than that of the modulating signal produced by respiration. The ECG. signal on the other hand is not a modulating signal but is a directly additive electrical impulse picked up by the electrodes.

Figure 3:
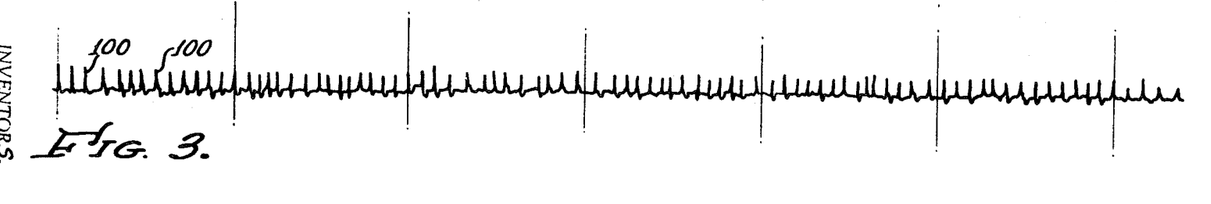
FIG. 3 is the separated ECG. or electrocardiogram signal of the heart.
Figure 4:
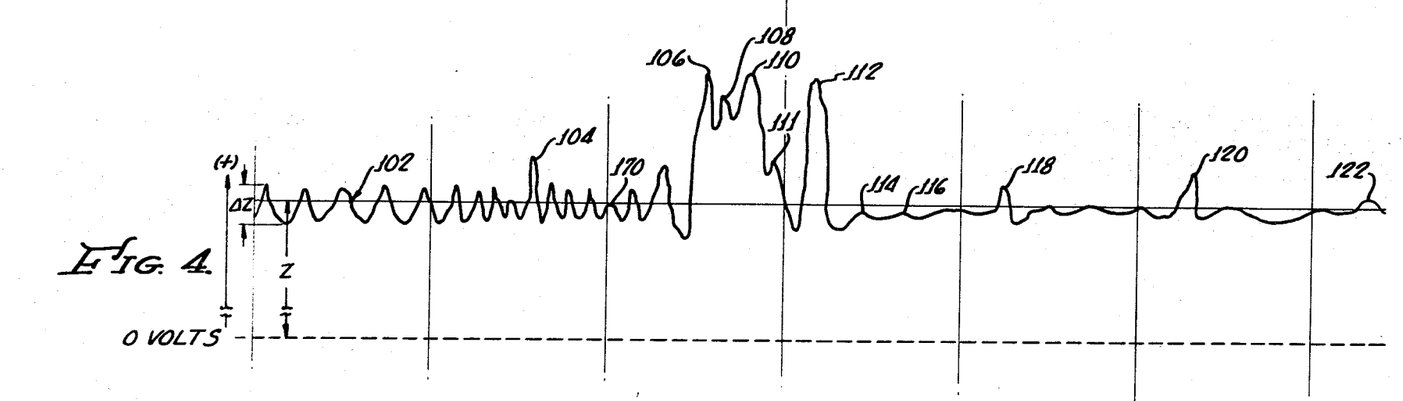
FIG. 4 is the signal emergent from the demodulator of FIG. 1 which is the output of the impedance pneumograph.

Referring now to the impedance pneumograph 10 and considering FIGS. 1 to 4, the amplitude modulated 50 kHz. carrier signal (FIG. 2) is amplified by the wide-band AC amplifier 38, and passed to the 12 kHz. to 100 kHz. band-pass filter 40 to separate or attenuate the ECG. signal from the modulated carrier signal. The ECG. signal is shown in FIG. 3. The filtered carrier signal passes to the demodulator 42, which rectifies and peak detects the carrier envelope to produce a positive signal which varies in accordance with the real and apparent transthoracic impedance changes in the subject, as shown in FIG. 4. This is the signal that appears on the output lead 24 from the impedance pneumograph and is applied to the 0.2 to 2 Hz. band-pass filter and amplifier 44 in the breath identification circuit 12.

Figure 12:
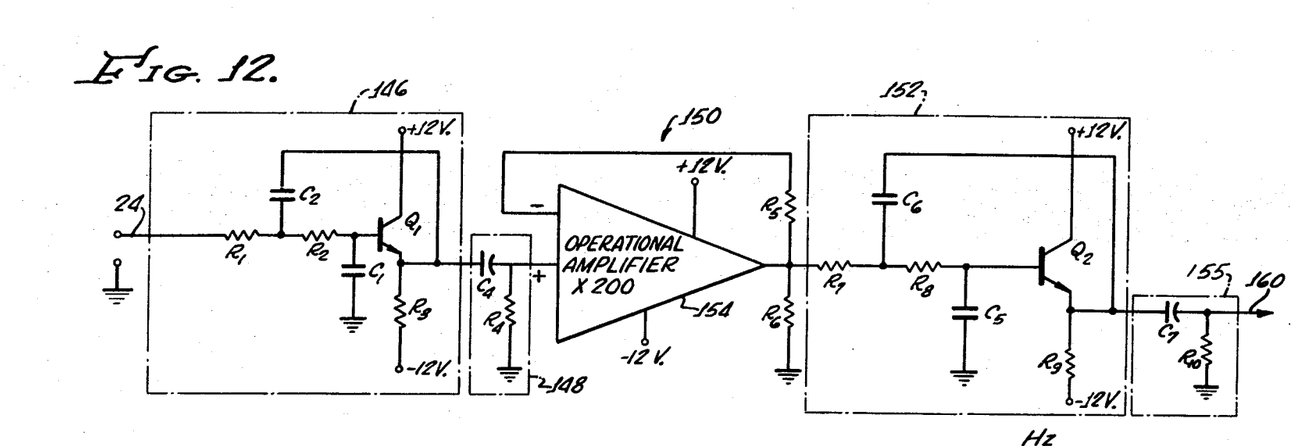
FIG. 12 is a more detailed circuit diagram of the 0.2 to 2 Hz. band-pass filter and amplifier in the breath identification circuit of FIG. 1.

The 0.2 to 2 Hz. band-pass filter and amplifier performs several functions. The detailed circuit is shown in FIG. 12 and its band-pass characteristic is shown in FIG. 14. The operation of the circuit is illustrated in gross by reference to the waveform diagrams of FIGS. 2, 4 and 5, and in more detail by the waveform diagram of FIG. 13, bearing in mind that there are so many possible combinations of occurrence in real respiration and other physiological activity that it is impractical to illustrate very many of them.

The vertical lines running through the waveforms of FIGS. 2 to 11 represent 10 seconds time intervals so as to assist in viewing the waveforms. Also, common reference numerals are employed in the different waveforms to designate common points in time on them so as to facilitate identification of circuit operations.

As best seen in FIG. 4, the output signal of the impedance pneumograph emerging from the demodulator 42 contains a nominal DC component which is a measure of the resting impedance $z$ and a small AC component representing the impedance change $\Delta z$. The resting impedance will be different for different subjects, and this total impedance will change slowly from various causes, for example, from deterioration of the electrode gel hence a change in the impedance across the electrode-skin interface. A typical value for the resting impedance is 500 ohms represented by a nominal DC component $|z|$ of 2 volts. The impedance change $\Delta|z|$ typically is 1 to 2 ohms representing a voltage change of 4 to 8 millivolts, although it may be much higher with a maximum of about 10 ohms representing a voltage change of 40 millivolts.

Looking now to the waveforms of Figs. 2 to 5, the electrically additive ECG. signal 100 is attenuated or separated in the impedance pneumograph from the modulating signal 102 produced by real or apparent transthoracic impedance changes. The resulting signal 102 is best seen in Fig. 4 where, going from left to right, it would appear that in the first 10-second time interval normal breathing is occurring at a rate of about 30 breaths per minute, increasing to about 60 breaths per minute during the second 10-seconds interval which may include one motion artifact 104. In the third 10-seconds interval, a large inhalation or possibly a motion artifact 106 occurs followed by what appears to be breaths on top of breaths at 108, 110, 111, or more specifically the condition where deep inspiration is followed by shallow expiration and further inspiration. In the fourth 10-seconds interval and following a large-breath or motion artifact 112, breathing apparently ceases although the shallow waves 114, 116 could result from very shallow breathing or from pulmonary blood flow. In the fifth, sixth and seventh 10 seconds intervals, single breaths 118, 120, 122 or motion artifacts apparently occur with no effective breathing in between.

Figure 5:
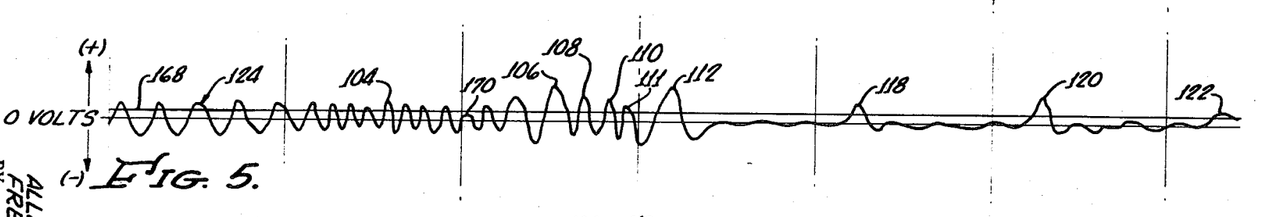
FIG. 5 is the signal emergent from the 0.2 to 2 Hz. band-pass filter and amplifier in the breath identification circuit of FIG. 1.

The 0.2 to 2 Hz. band-pass filter and amplifier 44 utilizes the signal 102 in Fig. 4 to produce the signal 124 illustrated in Fig. 5 which, while amplification is not graphically illustrated, actually is amplified by a factor of about 500 over the corresponding waveform of Fig. 4. Further, it will be noted in FIG. 5 that all breaths, including the breaths on breaths 106 to 111 produce crossings of the zero volt base line.

Figure 13:
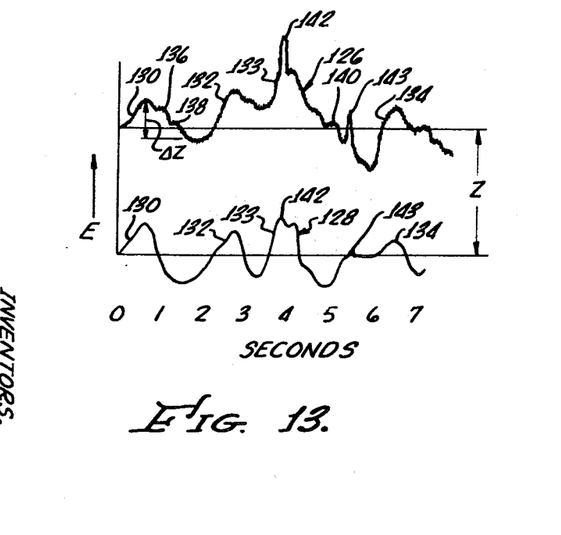
FIG. 13 is a waveform diagram illustrating some aspects of the operation of the band-pass filter and amplifier of FIG. 12.
Figure 14:
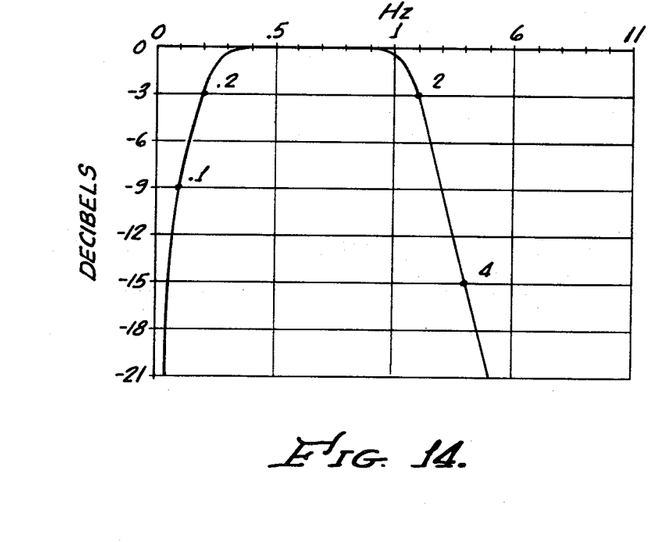
FIG. 14 is a diagram illustrating the pass band of the filter and amplifier of FIG. 12.

While the gross situation is illustrated in FIGS. 2 to 5, the functions of the band-pass filter and amplifier 44 are more acutely illustrated in the representative waveforms of FIG. 13 where the top waveform 126 represents the output of the demodulator 42 and the bottom waveform 128 represents the output of the band-pass filter and amplifier 44. The amplitude of the upper waveform 126 is greatly exaggerated in comparison to the amplitude of the lower waveform, so that both waveforms can be seen while ignoring the amplification factor. The upper waveform 126 as seen contains an extremely high-frequency component, a remnant of the 50 kHz. carrier signal. Also note that while several inspirations 130, 132, 133, 134 are relatively sharply defined the corresponding expirations are not as sharply defined and impedance changes from pulmonary blood flow such as at 136, 138, 140 and elsewhere are more predominantly apparent. Inhalations at 132 and 133 represent a breath on a breath and artifacts appear at 142 and 143.

Correspondingly in the lower waveform 128 the 50 kHz. remnants are no longer present, the breaths all produce crossings of the zero volt base line, the relatively high-frequency pulmonary blood flow waves are attenuated and the duration of inspiration and expiration waveforms is limited by the lower or 0.2 Hz. corner of the band-pass of the filter to a period of about 0.8 seconds.

Thus, the 0.2 to 2 Hz. band-pass filter and amplifier provides several combined functions. The pass band is very narrow and permits only those real or apparent transthoracic impedance changes which are most closely associated in frequency with breathing to pass without very considerable attenuation. It provides, therefore, selective amplification of the small respiratory signal, which permits an accurate definition point on the inspiratory side of the signal for purposes of level detecting.

The low-frequency corner of 0.2 Hz. is especially critical. A zero volts base line is obtained which provides a fixed reference for level detecting and eliminates low-frequency shifts in the real or apparent resting impedance of the subject. It establishes a time constant which determines zero crossings, insuring that large impedance changes, for example due to deep breaths or motion artifacts, are returned to the zero volt base line in about 0.8 seconds, hence, defining in terms of the signal a maximum inspiratory and expiratory duration which among other things defines the individual breaths of a breath-on-breath situation such that breathing rate information is preserved.

The high frequency corner of the pass band at 2 Hz. attenuates all high frequency components prior to amplification, thus minimizes the movement artifacts and heart-coupled pulmonary blood flow contribution to the impedance change $\Delta |z|$ with frequency components in excess of 2 Hz.

Referring now to FIG. 12, the band-pass filter and amplifier includes a first active low-pass filter stage 146 followed by a first high-pass filter stage 148 which is in turn coupled to the input of an operational amplifier stage 150. The output of the operational amplifier is passed to a second low-pass filter stage 152 followed by a second high-pass filter stage 154.

The first low-pass filter stage 146 receives the signal 126 (FIG. 13) from the demodulator 42 in the impedance pneumograph. Typically this signal is approximately 2 volts with a 4 millivolt AC component representing the respiratory impedance change $\Delta |z|$. The first filter stage includes a high $\beta$ transistor $Q_1$ having a high forward current transfer ratio. The transistor $Q_1$ is connected as an emitter follower to operate as an isolation amplifier having unity gain, a high input impedance and low output impedance. Also, the isolation amplifier makes the first stage low-pass filter 146 an active filter, which results essentially in a zero insertion loss especially important because the information signal representing the impedance change $\Delta |z|$ is quite small. The input circuit to the base of transistor $Q_1$ includes resistors $R_1$, $R_2$ and capacitor $C_1$ connected as an integrating network and providing a 6 decibel per octave rolloff at 2 Hz. An additional 6 decibel per octave rolloff is achieved by the emitter base feedback loop through capacitor $C_2$, resistor $R_2$ and capacitor $C_1$, such that the first low-pass filter stage 146 provides a total rolloff of 12 decibels per octave at 2 cycles per second.

Therefore, the first low-pass stage 146 greatly attenuates frequencies in excess of 2 Hz. prior to amplification, while providing essentially a zero insertion loss for the information signal representing the impedance change $\Delta |z|$.

The first-stage high-pass filter 148 is a simple network comprised of capacitor $C_4$ and resistor $R_4$ connected in the fashion of a differentiator. It provides a 6 decibel per octave rolloff at 0.2 Hz., thereby eliminating any DC component and attenuating any low-frequency components such as might result from a shifting in the resting impedance level of the subject.

The operational amplifier stage 150 is a conventional operational amplifier 154 having an amplification factor of 500 and including a feedback loop through a resistor $R_5$. The output of the operational amplifier 154 appears across resistor $R_6$, and is zero volts when $\Delta |z|$ is zero.

The second low-pass filter 152 is substantially identical with the first low-pass filter stage 146 with circuit values slightly altered to provide an additional 12 decibels rolloff per octave beginning at 4 Hz.

The second high-pass filter stage 155 also is similar to the corresponding first stage 148 with slightly altered circuit values and provides an additional 6 decibels per octave rolloff beginning at about 0.1 Hz.

Components outside the desired band-pass reaching the operational amplifier will be greatly amplified. In addition, power supply fluctuations and other circuit noise may be amplified. The second filter stages 152, 155 attenuate these amplified signals which lie outside of the desired band-pass. The circuit values in the second stages 152, 155 are designed to provide a slightly larger band-pass of 0.1 to 4 Hz. to insure that it closely encompasses but does not limit the desired band-pass of the first stages, which establish the basic 0.2 Hz. and 2 Hz. corners.

The resulting overall characteristic of the band-pass amplifier is seen in FIG. 14, and typical circuit values are given in the following Table I, noting that the power supply voltage utilized in the circuit in FIG. 12 is +12 volts DC and −12 volts DC as shown:

TABLE I

| $R_1$ | 330 KΩ | $C_1$ | 0.15 μf. | $Q_1$ | 2N3565 |
|---|---|---|---|---|---|
| $R_2$ | 330 KΩ | $C_2$ | 0.33 μf. | $Q_2$ | 2N3565 |
| $R_3$ | 20 KΩ | | | | |
| $R_4$ | 4.7 KΩ | $C_4$ | 120 μf. | | |
| $R_5$ | 20 KΩ | $C_5$ | 0.15 μf. | | |
| $R_6$ | 100 Ω | $C_6$ | 0.33 μf. | | |
| $R_7$ | 220 KΩ | $C_7$ | 23 μf. | | |
| $R_8$ | 220 KΩ | | | | |
| $R_9$ | 15 KΩ | | | | |
| $R_{10}$ | 4.7 KΩ | | | | |

Referring now to FIG. 1, 6, 15 and 16, the adjustable level detector 46 in the breath identification circuit receives the output signal from the 0.2 to 2 Hz. band-pass filter and amplifier over a lead 160 and functions to identify breaths digitally on a breath-by-breath basis.

Figure 15:
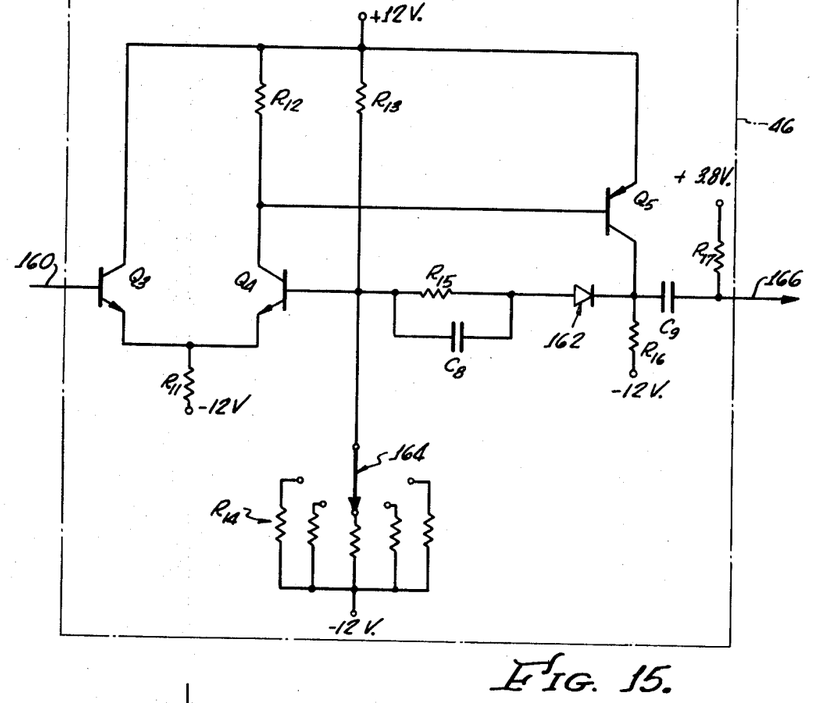
FIG. 15 is a detailed circuit diagram of the adjustable level detector in the breath identification circuit of FIG. 1; and, FIG. 16 is a waveform diagram illustrating the operation of the adjustable level detector of FIG. 15.

As seen in FIG. 15, the adjustable level detector comprises three transistors $Q_3$, $Q_4$, and $Q_5$, a diode 162, and a selector switch 164, all interconnected and supplied as shown. Transistor $Q_3$ is actually two transistors connected in complementary Darlington pair of achieve a high $\beta$ factor. The circuit values are given in Table II as follows:

TABLE II

| $R_{11}$ | 6.8 KΩ | $C_8$ | 100 μμf. | $Q_3$ | 2N4250 and 2N3565 complementary package |
|---|---|---|---|---|---|
| $R_{12}$ | 6.2 KΩ | $C_9$ | 0.1 μf. | $Q_4$ | 2N3646 |
| $R_{13}$ | 10 KΩ | | | | |
| $R_{14}$ | 11 KΩ to 14.6 KΩ | | | $Q_5$ | 2N3638A |
| $R_{15}$ | 270 KΩ | | | Diode | Silicon |
| $R_{16}$ | 24 KΩ | | | | |
| $R_{17}$ | 10 KΩ | | | | |

In the starting condition, an upper trip point level $E_{UT}$ is established (say at +0.6 volts) establishing the voltage-dividing ration between resistors $R_{13}$ and $R_{14}$. $R_{14}$ comprises any of the several resistors connected between the negative supply and the contacts of the manual switch 164, hence its value can be set by setting the switch to one of its contacts, thereby adjusting the upper trip point $E_{UT}$. Assuming zero volts on the base of transistor $Q_3$ and $E_{UT}$ or +0.6 volts on the base of transistor $Q_4$, transistor $Q_3$ is off or nonconducting and transistor $Q_4$ is on or conducting. Due to the voltage drop across $R_{12}$ to the base of transistor $Q_5$, this transistor $Q_5$ is on and the voltage on the cathode of the diode 162 is approximately +12 volts so that the diode is back biased and is nonconducting. Capacitor $C_9$ and resistor $R_{17}$ connected between the cathode of the diode 162 and the output lead 166 act as a UT circuit for the square wave (FIG. 6) appearing at the cathode of the diode.

Figure 7:
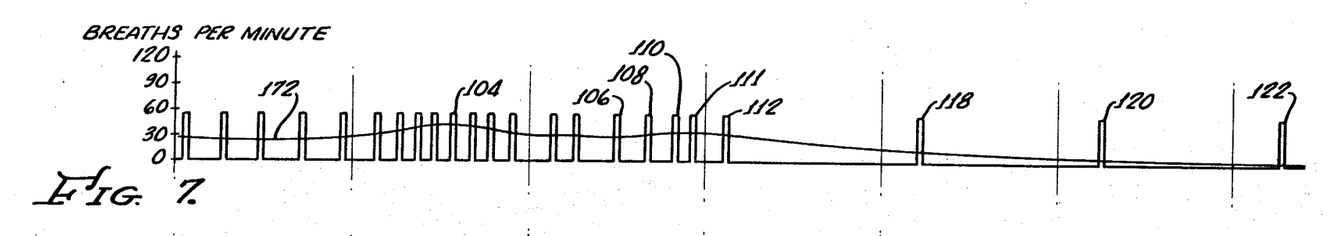
FIG. 7 is a double-wave diagram illustrating the output pulses from the one-shot pulse generator in the breath identification circuit of FIG. 1 and also illustrating the output of the integrating tachometer driven by the one-shot pulse generator.
Figure 8:
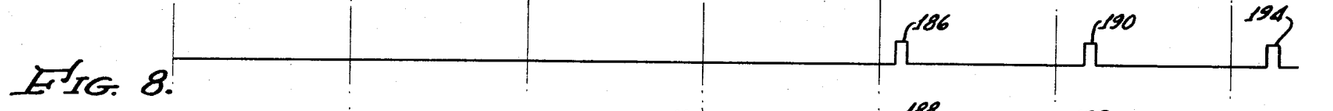
FIG. 8 is the inhibiting signal to the inhibit gate in the adaptive alarm circuit of FIG. 1.

As the signal on the lead 160 to the base of the transistor $Q_3$ approaches and reaches $E_{tT}$ or +0.6 volts, the transistor $Q_3$ begins to turn on, and having no limiting resistor in its collector circuit; it effectively begins to short circuit transistor $Q_4$ causing the current to begin to flow from the supply through $Q_3$ and the emitter resistor $R_{11}$. The transistor $Q_4$ begins to turn off, and with decreased current flowing through $R_{12}$ to the base of transistor $Q_5$, transistor $Q_5$ begins to turn off and the voltage on the cathode of diode 162 begins to swing negative very rapidly toward −12 volts. Considering that the $E_{tT}$ supplied at the base of transistor $Q_4$ is still a positive 0.6 volts, the diode 162 becomes conductive causing a drop in potential on its anode which is seen at the base of transistor $Q_4$ through the bypass capacitor $C_8$ thus insuring a quick shutoff of transistor $Q_4$, hence $Q_5$. The negative step in voltage at the cathode of the diode 162 is differentiated by the resistor capacitor combination $R_{17}$ $C_9$ to provide a negative going pulse on the output lead 166 to the inverter 48. This pulse is inverted to trigger the one-shot pulse generator 50, the output from which is shown in FIG. 7.

With the diode 162 conducting the voltage at the base of transistor $Q_4$ no longer is the voltage as determined by the divider $R_{13}$, $R_{14}$ but is a slightly lower positive voltage determined by the more complex network $R_{13}$, $R_{14}$, $R_{15}$, $R_{16}$, thus establishing a voltage $E_{LP}$ of about +0.4 volts called the lower trip point voltage at the base of transistor $Q_4$. The difference between the upper and lower trip point voltage levels is established primarily by the value of $R_{15}$. The larger the value of this resistor, the more closely the lower trip point voltage is to the upper trip point voltage.

As the signal on the input lead 160 falls below the lower trip point voltage $E_{LP}$ transistor $Q_3$ will turn off and transistors $Q_4$ and $Q_5$ will turn on, resulting in a reestablishment of the +12 volts at the cathode of the diode 162 and a positive going pulse on the output lead 166 to the inverter.

There is a large variation in the depth of breathing as well as in the rate of breathing. A deeper breath will produce a larger breath waveform. Thus by setting the switch 164 in the adjustable level detector (FIG. 15), it is possible to detect very shallow breaths including deeper breaths, or if desired for medical purposes, only deeper breaths to a selected degree may be detected.

Figure 6:
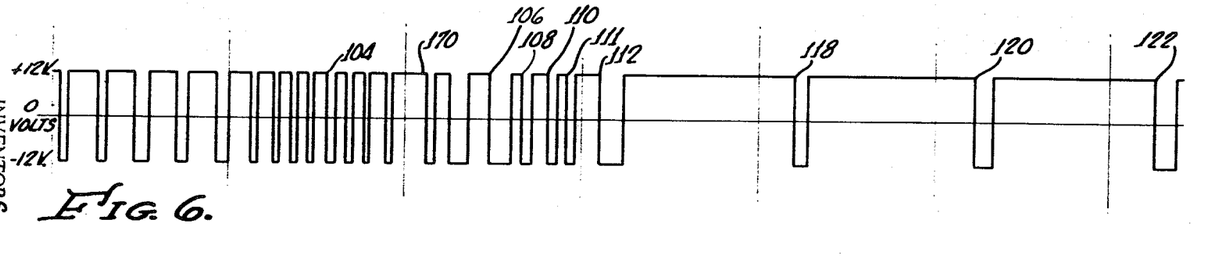
FIG. 6 is the output of the adjustable level detector, prior to differentiation, in the breath identification circuit of FIG. 1.

Viewing now FIGS. 5, 6 and 7, the upper trip point setting of the level detector as indicated by the line 168 (FIG. 5) will result in successive voltage drops of from +12 volts to −12 volts at the intercepts of this level with the inspiratory sides of the breath waveforms, thus triggering the one-shot pulse generator 50 to produce corresponding pulses of constant pulse width at these points in time (FIG. 7). The constant width pulses from the one-shot pulse generator provide breathing rate information to the integrating tachometer. The rate information is affected by the setting of the upper trip point, that is by the setting of the selector switch 164, in the sense that the higher the level setting the more the shallow breaths are ignored. Note, for example, that the breath waveform at 170 in Fig. 5 is missed, resulting in a correspondingly broad waveform in Fig. 6. Since only breaths of a minimum magnitude can exceed a particular set level, the measured breathing rate in conjunction with the setting of the selector switch 164 also is an indication of the minimum tidal volume of respiration and the minimum volume flow.

Also as seen in Fig. 7, the output of the integrating tachometer to the meter 22 is shown by an averaging waveform 172. The integrating tachometer has a 40-second response time, meaning that beginning with a zero breath per minute input and with a step function of say 30 breaths per minute, it would require an operating time of 40 seconds in order for the integrating tachometer to arrive at a DC level corresponding to 30 breaths per minute. The output from the integrating tachometer is breathing rate information integrated over a substantial period of time, utilizing the constant width pulses from the one-shot pulse generator 50. This tachometer, however, is not entirely satisfactory for indicating a cessation of breathing or a very low breathing rate to an alarm system because of its long time constant. Bearing in mind that a premature infant may vary its breathing rates radically during a particular period of time, the integrating tachometer to perform its function must ignore short time rate changes which necessitates that for a total cessation of breathing (apnea neonatorum) or a dangerously low breathing rate, the warning to the medical attendant would come in some instances too late. That is, the system, while operating satisfactorily under certain conditions would be inflexible and therefore would not accommodate the needs for monitoring infants with different breathing problems, especially apnea.

Figure 16:
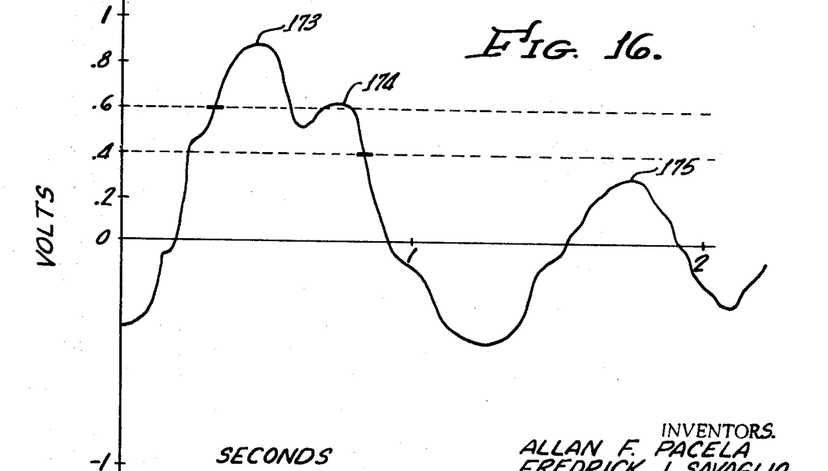

As seen in FIG. 16, the adjustable level detector digitally detects each breath, typified by a shallow breath waveform 173, on the relatively sharp and medically meaningful inspiratory part of the respiratory cycle, yet it has a sufficient hysteresis (adjustable by the value of resistor $R_{15}$ in Fig. 15) whereby it will not again detect a respiratory cycle until a significantly lower level has been passed during the expiratory side of the respiratory cycle. This prevents other signal components, such as a pulmonary blood flow signal as seen at 174, from retriggering the adjustable level detector and bring counted as breaths. Hence, the hysteresis is deliberate, and in this instrument amounts to approximately 0.2 volts to insure that such multiple triggering does not occur.

Also illustrated in FIG. 16 is a waveform 175 depicting a large pulmonary blood flow signal during apnea and under conditions of an accompanying lowered heart rate falling well within the 0.2 to 2 Hz. band-pass of the filter and amplifier 44. The input signal to the level detector, as illustrated in Fig. 16, is scaled at about 2 volts per ohm transthoracic impedance change $\Delta z$. Large pulmonary blood flow signals may have a positive peak of about 0.25 ohms or 0.5 ohms peak to peak. Hence, as a matter of discrimination against such signals, the lowest trip point level setting permitted by the selector switch 164 in the level detector is +0.6 volts, a level significantly higher Thus, discrimination is accomplished in the breath identification circuit both in a frequency and on an amplitude basis.

Referring now to Fig. 1, it can be seen that at the breath identification lamp 18 and the meter 22, constant respiratory monitoring is provided for the medical attendant on a breath-by-breath basis by a light as well as by indicating the average breathing rate on the meter. However, constant physical attendance at the patient is not always desirable or possible. Hence, the adaptive alarm circuit 16, which also receives the output from the one-shot pulse generator in the breath identification circuit 12, provides a sensing means which monitors the respiration in the absence of an attendant.

In the adaptive alarm circuit 16, the primary device is the 5 to 30 second adjustable alarm timer 68. This is a conventional timer, adjustable between a 5 to 30 second setting, which if not reset by a pulse, measures out its set time interval and provides a DC voltage level on its output lead 180. This DC voltage level indicates that the lapse of time between breaths has exceeded the setting, thereby lighting the Apnea (or low breathing rate) alarm lamp 86 and, through the OR gate 70 and normally closed pole 72, powering the low-frequency oscillator through the OR gate 80 to cause a rising and falling audio signal from the audio alarm 90 in order to summon the attendant.

Normally the attendant will arrive immediately and will actuate the manual disabling switch 71 thus interrupting the audio alarm and closing power through the pole 76 causing the circuit-disabled lamp 92 to go on as a reminder to the attendant. If, however, the attendant does not arrive within 30 seconds, the slow operate quick-release relay 82 will close its armature 84 thus supplying constant DC power through the OR gate 80 to the audio alarm 90 causing a loud constant audio alarm. The relay 82 remains activated through a holding circuit comprising lead 182, and OR gate 70, despite the fact that several breaths or motion artifacts may occur to reset the 5 to 30 seconds adjustable alarm timer 68, thus insuring that an attendant is present once the constant alarm has been triggered. After the attendant has arrived and disabled the system by actuating the switch 171, the relay 82 quickly releases its armature 84 and breaks its holding circuit.

While medical attendants are extremely conscientious people, the human element, always present, and the problems of constant attendance to patients makes certain adaptive characteristics of the alarm system most useful. This is especially true since nurses and medical attendants must be considered unskilled when making adjustments of electrical apparatus and considering all the implications in that apparatus that are involved in that adjustment. For example, if a nurse doesn't want to be constantly interrupted by alarms, likely she will set the alarm timer 68 on a 30-seconds setting. This could allow the infant to remain in permanent apnea, without alarm, depending on the setting of the level detector and depending on whether or not there were certain motion artifacts or shallow breathing occurring within several succeeding 30-second time intervals sufficient to reset the alarm timer. Motion artifacts occurring during the alarm timing period can reset the alarm and result in a false, no-alarm, response. The adaptive alarm guards against both of the above problems.

The adaptive portion of the alarm circuit 16 includes the flip-flop or counter 56, the adaptive timer 58, the two one-shot pulse generators 62, 64, the pulse delay 60 and the inhibiting gate 66. The flip-flop 56 is triggered back and forth from its "1" or set state to its "0" or reset state by the pulses from the one-shot pulse generator 50 in the breath identification circuit. When it is triggered to its "0" state, it fires the one-shot pulse generator 62, and if the inhibit gate 66 is not inhibited, resets the alarm timer 68. Thus, ostensibly, every second pulse from the one-shot pulse generator 50 will reset the alarm timer 68. This implies that two, not one, breath motion artifact must occur in each interval of time as set on the alarm timer 68 in order to insure that it is reset prior to the time it runs out to produce the DC alarm level on its output lead 180.

Nevertheless, it would be an uncommon occurrence to have two motion artifacts or pulmonary blood flow signals occur during successive 30 second intervals, or such shorter intervals as may be set by the alarm timer 68. This problem is solved by the adaptive timer 58.

The adaptive timer 58 is a fixed 10-seconds timer which, if not reset during a 10-second interval, produces a pulse on its output lead 184. This pulse resets the flip-flop 56 to its "0" state through the pulse delay 60, after having already inhibited the inhibit gate 66 through the one-shot pulse generator 64 so that this resetting of the flip-flop 56 does not produce a resetting of the alarm timer 68. In effect the adaptive timer 58 insures that one detected waveform must occur in each 10-second interval, failing in which two additional detected waveforms (or more as explained hereinafter) must be presented in a subsequent 10-second interval in order to provide a reset pulse to the alarm timer 68. For example, if the alarm timer is set on 30 seconds, the adaptive timer insures that the alarm timer will not be reset, hence will continue to run out its period to produce an alarm so long as the detected waveform (ostensibly breathing) rate is less than six per minute.

Figure 9:
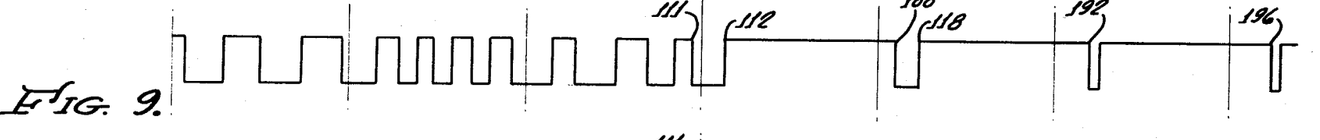
FIG. 9 is the signal on the "1" terminal (the inverse of the signal on the "0" terminal) of the flip-flop in the adaptive alarm circuit of FIG. 1.

Looking at Figs. 7 to 11, it can be seen that detected waveform 111 causes the output of the flip-flop 56 to fall (Fig. 9) thus producing a positive voltage level on the output terminal of the flip-flop, and producing a pulse (Fig. 10) from the one-shot pulse generator 62 to reset the alarm timer 68. The detected waveform 112 triggers the flip-flop 56 to its "1" set state, which produces no effect, although the same signal does reset the adaptive timer 58. Between this instant, and the occurrence of the detection of the waveform 118 which is more than 10 seconds later, the flip-flop 56 is reset to its "0" state by the running out of the adaptive timer which triggers the one-shot generator 64 to provide an inhibit pulse 186 (Fig. 8) to the inhibit gate, and through pulse delay 60 resets the flip-flop 56 to its "0" state as indicated at 188 (Fig. 9). Immediately thereafter the detected waveform 118 triggers the flip-flop to its "1" state. However, an excess of 10 seconds occurs between the detected waveform 118 and 120, thus producing a second inhibit pulse 190, so that the return of the flip-flop to its "0" state as indicated at 192 again does not produce a reset pulse to the alarm timer 68 as indicated by the absence of the correspondingly referenced pulses in FIG. 10. Due to a greater than 10-seconds interval between detected waveforms 120 and 122, the same inhibit pulse occurs at 194 returning the flip-flop to its "0" state as indicated at 196, thus precluding a reset pulse to the alarm timer 68.

Figures 10, 11:
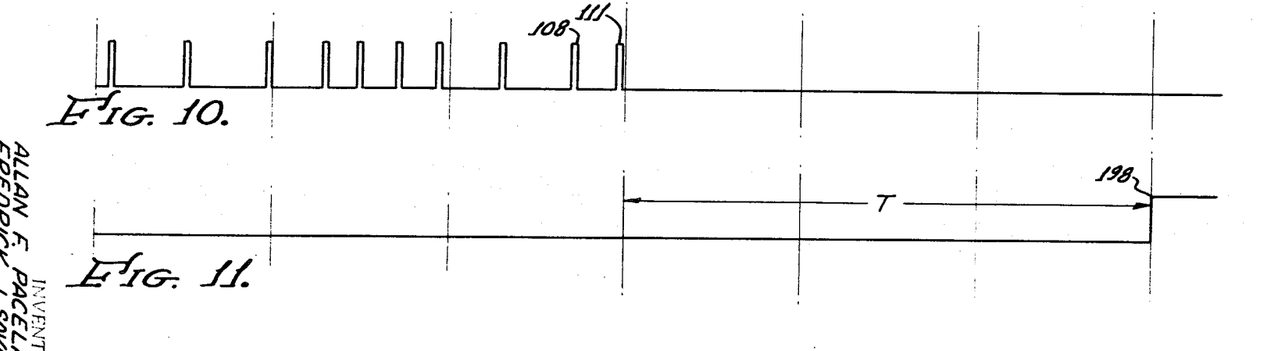
FIG. 10 is the input to the inhibit gate from the one-shot pulse generator, in the adaptive alarm circuit of FIG. 1.
FIG. 11 is the output of the 5 to 30 seconds alarm timer in the adaptive alarm circuit of FIG. 1.

As measured from the last reset pulse to the alarm timer which is pulse 111 in Fig. 10, the time interval T corresponding to the setting of the alarm timer 68 will transpire. As illustrated this time interval is 30 seconds, causing the DC voltage level on output lead 180 to occur as indicated on the waveform at 198 (Fig. 11), thus lighting the Apnea alarm lamp 86 and causing the audio alarm 90 to pulsate.

Once breathing ceases, it is important to sound the alarm when the period set by the adjustable alarm timer 68 expires. Any delay, as may be caused by an artifact signal through the one-shot 50 resetting the timer 68, may be fatal. Accordingly, through the adaptive timer 58, the adaptive alarm 16 is required to receive two pulses in a 10-second interval following an initial period of 10 seconds without breathing in order to reset the timer 68 and thereby postpone sounding an alarm. For greater assurance that breathing has been resumed after the initial 10 seconds of the timer 58 has elapsed, a switch may be actuated to place an additional flip-flop, or flip-flops, in cascade with the flip-flop or counter 56 to increase the radix of the counter from two to four, or more, so that four, or more, pulses must be received in a 10-second interval from the one-shot 50 to reset the timer 68. The counter may be further modified during subsequent 10-second intervals if desired. Alternatively, the radix of the counter, flip-flop 56, may be left the same after the initial 10 seconds, and means provided for reducing the period of the adaptive timer 58 to achieve the same results. That may be accomplished, for example, by a switch activated at the end of the initial 10 seconds to alter the timer or substitute another timer of, for example, 5 seconds. The lapse of that shorter period could then be used to further shorten the period of the adaptive timer 58.

The electrode monitoring circuit 14 detects relatively large drifts in the apparent base or resting impedance of the subject resulting from equipment malfunction or any other cause, although the cause usually is related to the biological skin electrodes. For example, during the handling of an infant or as a result of the infant's own body movement it is possible that the electrodes may become detached or displaced to the point that the apparent transthoracic impedance is considerably increased.

In the electrode monitoring circuit 14, the amplifier and 0.2 Hz. low-pass filter 52 eliminate all high-frequency changes in impedance and discriminate in favor of the more permanent or low-frequency changes in the basic DC level of the signal from the impedance pneumograph. The level detector 54 is adjustable so that it can be adapted to the resting impedance of a particular subject, which will be different for different subjects. The detector 54 can be set to detect at predetermined levels of base impedance incompatible with normal impedance changes in the subject, so as to provide an output signal on the lead 26 running to the electrode alarm lamp 88 in the adaptive alarm circuit 16, as well as to the OR gate 70 and thence to the audio alarm.

When an alarm condition occurs, the medical attendant upon his arrival will notice whether it is the breath alarm lamp 86 or the electrode alarm lamp 88 that is lighted. Thus, the attendant immediately knows whether it is a respiratory failure or an equipment problem. If both are lighted, the problem could be either.

While the principles of the invention have now been made clear in an illustrative embodiment, there will be immediately obvious to those skilled in the art many modifications which are particularly adapted for specific applications without departing from those principles. The following claims are therefore intended to cover and embrace any such modifications, within the limits only of the true spirit and scope of the invention.

What is claimed is:

1. A physiological monitoring system comprising:
   means for monitoring physiological activity in a living body and producing a correspondingly varying electrical signal;
   means coupled to said first means for digitally identifying signal components corresponding to specific physiological activity;
   said digital identifying means including a detector for providing output signals responsive to a characteristic of the electrical signal passing a threshold level; and,
   an alarm system coupled to said digital identifying means and including an adjustable alarm timer sensitive to the time intervals between said output signals for activating an alarm under predetermined conditions of apnea, and an adaptive timing means for inhibiting the effect of selected digital output signals on the adjustable alarm timer, said predetermined conditions being determined at least in part by the setting of the adjustable alarm timer and in part by action of said adaptive timing means.

2. The physiological monitoring system of claim 1, wherein the identifying means further includes means for discriminating against signal components having a frequency outside the primary frequency range of the specific physiological activity, and means for adjustably setting the threshold value of the detector so as to discriminate against signal components having amplitudes lower than the primary amplitude of signal components resulting from the specific physiological activity.

3. The physiological monitoring system of claim 1 wherein the detector includes means for alternately detecting the signal exceeding a first threshold value and falling below a second threshold value, the second threshold value being substantially less than the first.

4. The physiological monitoring system of claim 1 further comprising measuring means for sensing the detector output signals and indicating the rate of the specific physiological activity.

5. A respiration monitor comprising:
   transducer means for providing an electrical signal having characteristics which vary as a function of the respiration activity in a living body;
   a breath identification circuit, including both frequency- and amplitude-discriminating means, connected to said transducer, for identifying signal components resulting from respiration and producing a digital output signal for each breath;
   means connected to said breath identification circuit for monitoring the digital output signals, said means comprising an alarm means, an adjustable timer connected to said alarm means for activating said alarm means after lapse of a first time interval determined by said adjustable timer unless said adjustable timer is reset during the first time interval; and,
   adaptive timing means responsive to the digital output signals for automatically resetting said adjustable timer to initiate the first time interval when the interval between successive digital output signals occurring in said first time interval is less than a second time interval determined by said adaptive timing means, the second time interval being less than the first time interval.

6. The respiration monitor of claim 5 wherein the monitoring means further comprises an integrating tachometer and a meter driven by the tachometer so as to indicate respiration rate on an average rate basis, while allowing alarms to be established on the basis of the time elapsed from the last event.

7. The apparatus of claim 5 wherein the alarm means is audiovisual, including both a lamp and an audio alarm.

8. The apparatus of claim 7 wherein the alarm means includes means for altering the audio alarm in response to the elapse of a set time interval following the activation of the alarm means.

9. The apparatus of claim 5 wherein the adaptive timing means comprises a counter, the adjustable timer being responsive to one stage of the counter.

10. The apparatus of claim 9 wherein the adaptive timing means includes an adaptive timer responsive to the digital output signals for controlling the counter to prevent the resetting of the adjustable timer when the signals occur at less than a predetermined rate on a breath-by-breath basis.

11. The respiration monitor of claim 5 wherein the frequency-discriminating means comprises a band-pass filter for substantially passing only frequencies of the transducer electrical signal which are a function of respiration.

12. The respiration monitor of claim 5 wherein the frequency-discriminating means comprises a narrow band-pass filter having a band-pass range of within about 0.2 to 2 Hz.

13. The respiration monitor of claim 5 wherein the monitoring means further comprises a lamp responsive to the digital output signals for visually identifying breath on a breath-by-breath basis.

14. The respiration monitor of claim 5 wherein the amplitude-discriminating means comprises an adjustable level detector, so that in conjunction with its setting the digital signals provide minimum respiratory volume and flow as well as respiratory rate information.

15. The apparatus of claim 14, wherein the level detector comprises:
   a first circuit for sensing the electrical signal level of the inspiratory portion of the respiratory signal component; and,
   a second circuit for sensing the electrical signal level of the expiratory portion of the respiratory signal component.

16. The apparatus of claim 14 wherein the level detector drives a constant width pulse generator to provide the digital output signals from the breath identification circuit.

17. A respiration monitor comprising an impedance pneumograph for monitoring the respiration in a living body and producing an electrical signal having characteristics which vary as a function of respiration activity in the living body being monitored;
   a breath identification circuit, including both frequency- and amplitude-discriminating means, connected to said impedance pneumograph, for identifying electrical signal components resulting from respiration and producing a digital output signal for each breath; and,
   means for sensing the digital output signals comprising an alarm system including an adjustable alarm timer sensitive to the time intervals between the digital output signals for activating an alarm under predetermined conditions of respiration activity, and an adaptive timing means for inhibiting the effect of selected digital signals on the adjustable alarm timer, said predetermined conditions being determined at least in part by the setting of the adjustable alarm timer and in part by action of said adaptive timing means.

18. The respiration monitor of claim 17 wherein the sensing means further comprises an integrating tachometer and a meter driven by the tachometer so as to indicate respiration rate on an average rate basis, while allowing alarms to be established on the basis of the time elapsed from the last event.

19. The apparatus of claim 17 wherein the alarm system further includes an audio alarm and means for altering the audio alarm in response to the elapse of a set time interval following the onset of the alarm condition.

20. The apparatus of claim 17 wherein the adaptive timing means comprises a counter, the adjustable alarm timer being responsive to the output of said counter.

21. The apparatus of claim 17 wherein the adaptive timing means includes an adaptive timer responsive to the digital output signals for controlling the adaptive timing means to inhibit the effect of the digital output signals on the adjustable alarm timer when the signals occur at less than a predetermined rate on a breath-by-breath basis.

22. The respiration monitor of claim 17 wherein the frequency-discriminating means comprises a band-pass filter for substantially passing only frequencies of the impedance pneumograph electrical signal which are a function of respiration.

23. The respiration monitor of claim 17 wherein the frequency-discriminating means comprises a narrow band-pass filter having a band-pass range of within about 0.2 to 2 Hz.

24. The respiration monitor of claim 17 wherein the sensing means further comprises a lamp responsive to the digital output signals for visually identifying breaths on a breath-by-breath basis.

25. The respiration monitor of claim 17 wherein the amplitude-discriminating means comprises an adjustable level detector so that, in conjunction with its setting, the digital signals provide minimum respiratory volume and flow as well as respiratory rate information.

26. The apparatus of claim 25, wherein the level detector comprises:
a first circuit for sensing the electrical signal level of the inspiratory portion of the respiratory signal component; and,
a second circuit for sensing the electrical signal level of the expiratory portion of the respiratory signal component.

27. The apparatus of claim 25 wherein the level detector drives a constant width pulse generator to provide the digital output signals from the breath identification circuit.

28. A physiological monitoring system comprising:
a constant-current impedance pneumograph including biological skin electrodes for monitoring transthoracic impedance in a living body and producing a correspondingly varying electrical signal;
means including a band-pass filter coupled to said impedance pneumograph for detecting signal components resulting from respiration and for producing an output pulse of predetermined amplitude and duration for each breath of a selected minimum volume;
an alarm system including audiovisual alarms;
an adjustable timer for activating said audiovisual alarms after the lapse of a first time interval determined by said adjustable timer unless said adjustable timer is reset within said first time interval; and,
an adaptive timer means responsive to said output pulses for automatically resetting the adjustable timer to initiate the first time interval when the time interval between successive output pulses occurring during the first time interval is less than a second time interval determined by said adaptive timer means, said second time interval being less than said first time interval.

29. A respiration monitoring system, comprising:
transducer means for producing a first electrical signal which varies as a function of the respiration activity in a living subject;
a breath identification circuit connected to said transducer means for producing a second electrical signal in response to at least one selected respiratory characteristic of the first electrical signal; and,
means for monitoring the second electrical signal for a first selected condition of respiratory activity and providing an alarm indication in the event of the balance of said first selected condition, said means including an adaptive timing means responsive to the second electrical signal for automatically permitting said monitoring means to provide said alarm indication despite the occurrence of said first selected condition unless a second selected condition of respiratory activity is also present.

30. A respiration monitoring system as defined in claim 29 wherein said monitoring means includes an adjustable timer responsive to said adaptive timing means for providing said alarm indication under the first and second selected conditions of respiration activity determined by the adjustable timer and by the adaptive timing means, respectively.

31. A respiration monitoring system as defined in claim 29 wherein said adaptive timing means comprises:
an inhibit gate having input, output and control terminals, the output terminal of which is connected to the adjustable timer;
a counter having input, reset and output terminals, said counter providing a signal at its output terminal in response to a count of a predetermined number of selected events of the second electrical signal applied to the counter input terminal, the output terminal of said counter being connected to the input terminal of the inhibit gate, through which gate the counter output signal is passed to reset the adjustable timer; and,
an adaptive timer having input and output terminals, said adaptive timer being responsive to the second electrical signal applied to its input terminal, the output terminal of said adaptive timer being connected to the inhibit gate control terminal and the counter reset terminal to inhibit the gate and reset the counter under second selected conditions of respiration activity.

32. A respiration monitoring system as defined in claim 29 wherein said breath identification circuit comprises adjustable amplitude-discriminating means for providing said second electrical signal only when said first electrical signal exceeds a selected magnitude.

33. A respiratory monitoring system as defined in claim 32 wherein the amplitude-discriminating means provides said second electrical signal only when said first electrical signal magnitude exceeds a first selected level related to respiratory inspiration after falling below a second selected level related to respiratory expiration.

34. A respiration monitoring system as defined in claim 29 wherein said breath identification circuit comprises a frequency-discriminating means for substantially passing only the frequencies of the first electrical signal which are a function of respiration.

35. A respiration monitoring system as defined in claim 32 wherein said breath identification circuit further comprises frequency-discriminating means for substantially passing only the frequencies of the first electrical signal which are a function of respiration.

36. A respiration monitoring system as defined in claim 33 wherein said breath identification circuit further comprises frequency-discriminating means for substantially passing only the frequencies of the first electrical signal which are a function of respiration.

37. A respiration monitoring system comprising:
transducer means for producing a first electrical signal which varies as a function of the respiration activity in a living subject;
a breath identification circuit, including amplitude discriminating means, connected to said transducer means for producing a second electrical signal only when the first electrical signal amplitude exceeds a first selected level related to respiratory inspiration after having dropped below a second selected level related to respiratory expiration; and,
means connected to said breath identification circuit for monitoring the second electrical signal for selected conditions associated with the respiration activity.

38. The respiration monitoring system as defined in claim 37 wherein said breath identification circuit further includes frequency-discriminating means for passing substantially all the frequencies of the first electrical signal which are solely a function of respiration.

39. The respiration monitoring system as defined in claim 37 wherein said monitoring means includes an adjustable timer responsive to first selected characteristics of the second electrical signal for activating an alarm system.

40. The respiration monitoring system as defined in claim 39 wherein said means for monitoring further includes an adaptive timing means for altering the response of the adjustable timer to the second electrical signal as a function of second selected characteristics of the second electrical signal.

41. The respiration monitoring system as defined in claim 40 wherein said adaptive timing means comprises:
 an inhibit gate connected to the input of said adjustable timer for preventing the resetting of the adjustable timer when the second selected characteristics of the second electrical signal are present;
 a counter, connected to one input of the inhibit gate for counting a predetermined number of respiratory events present in the second electrical signal and producing a pulse in response thereto to reset the adjustable timer when the inhibit gate is open; and,
 an adaptive timer having an output connected to a second input of the inhibit gate and to the counter, said adaptive timer being responsive to the second selected characteristics of the second electrical signal for closing the inhibit gate and resetting the counter.

42. A physiological monitoring system for monitoring the respiration of a living subject comprising:
 transducer means for providing an electrical signal having characteristics which vary as function of the respiration of the subject being monitored;
 a bilevel amplitude detector means connected to said transducer means for providing an output signal each time the electrical signal magnitude exceeds a first threshold level after having dropped below a second threshold level, the first and second levels being determined respectively by the inspiratory and expiratory portions of the electrical signal produced as a function of respiration; and
 means connected to said detector for continuously monitoring the output signal from said detector for selected respiration characteristics including means for indicating the absence of said selected respiratory characteristics.

43. In a physiological monitoring system of the type used to monitor respiration, wherein a transducer converts the physiological activity associated with respiration into an electrical signal and wherein a breath identification circuit detects that portion of the electrical signal associated with respiration activity, an adaptive alarm system comprising:
 an adjustable timer for producing an alarm when the time interval between breaths exceeds a first selected time interval; and,
 adaptive timing means responsive to each breath and connected to the adjustable timer for automatically resetting said adjustable timer to initiate the first time interval when the time interval between successive breaths is less than a second time interval determined by said adaptive timing means, the second time interval being less than the first time interval.

PO-1050
(5/69)

UNITED STATES PATENT OFFICE
CERTIFICATE OF CORRECTION

Patent No. 3,608,542                    Dated September 28, 1971

Inventor(s) Allan F. Pacela and Fredrick J. Savaglio

It is certified that error appears in the above-identified patent and that said Letters Patent are hereby corrected as shown below:

| | |
|---|---|
| Column 3, line 51, | "form" should be --from--. |
| Column 6, line 16, | "dies" should be --does--; |
| Column 6, line 66, | after "volts)" insert --by--. |
| Column 7, line 5, | "UT" should be --differentiating--; |
| Column 7, line 21, | after "hence" insert --transistor--. |
| Column 8, line 39, | "$\Delta z$" should be --$\Delta |z|$--; |
| Column 8, line 42, | after "lowest" insert --upper--; |
| Column 8, line 45, | "in" should be --on--. |
| Column 9, line 40, | after "breath" insert --or--; |
| Column 9, line 45, | after "would" insert --not--. |
| Column 13, line 72, | "balance" should be --absence--. |

Signed and sealed this 18th day of April 1972.

(SEAL)
Attest:

EDWARD M. FLETCHER, JR.               ROBERT GOTTSCHALK
Attesting Officer                     Commissioner of Patents